US008471959B1

United States Patent
Zhang et al.

(10) Patent No.: US 8,471,959 B1
(45) Date of Patent: Jun. 25, 2013

(54) MULTI-CHANNEL VIDEO FRAME INTERPOLATION

(75) Inventors: Hongmin Zhang, Santa Clara, CA (US); Lihang Zhang, Shanghai (CN); Miao Sima, Shanghai (CN); Yue Ma, Pleasanton, CA (US)

(73) Assignee: Pixelworks, Inc., Portland, OR (US)

( * ) Notice: Subject to any disclaimer, the term of this patent is extended or adjusted under 35 U.S.C. 154(b) by 471 days.

(21) Appl. No.: 12/561,920

(22) Filed: Sep. 17, 2009

(51) Int. Cl.
*H04N 7/01* (2006.01)

(52) U.S. Cl.
USPC .......................................... 348/441

(58) Field of Classification Search
USPC ............. 348/441, 445, 448, 459, 458, 446, 348/452, 451, 699; 375/240.01, 240.26, 240.24, 375/240.16
See application file for complete search history.

(56) References Cited

U.S. PATENT DOCUMENTS

| | | | | |
|---|---|---|---|---|
| 5,995,154 A * | 11/1999 | Heimburger | .................. | 348/448 |
| 7,548,276 B2 * | 6/2009 | Mizuhashi et al. | ........... | 348/459 |
| 7,564,902 B2 * | 7/2009 | Sasai et al. | ............... | 375/240.26 |
| 7,720,150 B2 * | 5/2010 | Lee et al. | ................. | 375/240.16 |
| 7,773,674 B2 * | 8/2010 | Kawada et al. | .......... | 375/240.16 |
| 8,077,924 B2 * | 12/2011 | Suzuki et al. | ................. | 382/107 |
| 8,160,143 B2 * | 4/2012 | Sasai et al. | ............... | 375/240.16 |
| 2007/0140351 A1 * | 6/2007 | Ho | ............................ | 375/240.24 |
| 2007/0200838 A1 * | 8/2007 | Lee et al. | ...................... | 345/204 |
| 2008/0239144 A1 * | 10/2008 | Tanase et al. | .................. | 348/441 |
| 2009/0015712 A1 * | 1/2009 | Sato et al. | ..................... | 348/441 |
| 2009/0059067 A1 * | 3/2009 | Takanohashi et al. | ........ | 348/452 |
| 2009/0180543 A1 * | 7/2009 | Tsuda et al. | ............. | 375/240.16 |
| 2009/0195691 A1 * | 8/2009 | Wyman | ........................ | 348/452 |
| 2009/0279799 A1 * | 11/2009 | Suzuki et al. | ................. | 382/236 |
| 2010/0033620 A1 * | 2/2010 | Hoshino et al. | ............... | 348/441 |
| 2010/0079665 A1 * | 4/2010 | Yamauchi et al. | ......... | 348/416.1 |
| 2010/0123698 A1 * | 5/2010 | Park et al. | ..................... | 345/208 |
| 2010/0302451 A1 * | 12/2010 | Ishikawa | ....................... | 348/699 |

* cited by examiner

*Primary Examiner* — Paulos M Natnael

(74) *Attorney, Agent, or Firm* — Marger Johnson & McCollom PC

(57) ABSTRACT

A system including a memory configured to store a plurality of initial frames of a video signal and a plurality of motion vectors; and a multi-frame interpolator coupled to the memory and including a first output port and a second output port, the frame interpolator configured to generate a first output frame and a second output frame from the initial frames and the motion vectors, to output the first output frame through the first output port and output the second output frame through the second output port.

14 Claims, 5 Drawing Sheets

US 8,471,959 B1

MULTI-CHANNEL VIDEO FRAME INTERPOLATION

BACKGROUND

This disclosure relates to video interpolation and in particular, to multi-channel video frame interpolation.

Video sources can have a variety of frame rates. For example, video sources related to movies produced on film can have a frame rate of approximately 24 frames per second. Video sources related to television can have frame rates of approximately 30 frames per second. However, displays may have a refresh rate of 60 Hz, 120 Hz, 240 Hz, or the like. That is, the display is updated or refreshed at a higher rate than the video source.

The frames of the lower frame rate video sources can be interpolated to create intermediate frames between the original frames of the video source. For example, motion vectors can be calculated for changes between two frames of a video source. These motion vectors can be used to create the intermediate frames by interpolating the motion of the video between the two frames. Thus, for a video source with a 24 frames per second frame rate, an additional four frames can be inserted between two of the frames to generate 120 frames per second, or a 120 Hz refresh rate.

While performing such interpolation, typically, a single frame is interpolated at a time. However, some video display techniques use multiple frames in driving a single frame of a displayed image. For example, a boost circuit for driving a liquid crystal display (LCD) can use two frames to determine an amount to overdrive the LCD to achieve a desired transition time. Since only a single frame is interpolated at a time, a previously interpolated frame must be stored in a memory to be available for combination with another, recently interpolated, frame in the boost circuit.

SUMMARY

An embodiment includes a system including a memory configured to store a plurality of initial frames of a video signal and a plurality of motion vectors; and a multi-frame interpolator coupled to the memory and including a first output port and a second output port, the frame interpolator configured to generate a first output frame and a second output frame from the initial frames and the motion vectors, to output the first output frame through the first output port and output the second output frame through the second output port.

Another embodiment includes receiving a first initial frame of a video signal; receiving a second initial frame of a video signal; receiving motion vectors associated with a difference between the first initial frame and the second initial frame; interpolating at least one interpolated frame between the first initial frame and the second initial frame in response to the motion vectors; and outputting a plurality of output frames from among the first initial frame, the second initial frame, and the at least one interpolated frame through a plurality of ports.

DETAILED DESCRIPTION

Embodiments will be described in reference to the drawings. In particular, embodiments will be described where multiple video frames can be interpolated at a time.

Figure 1:
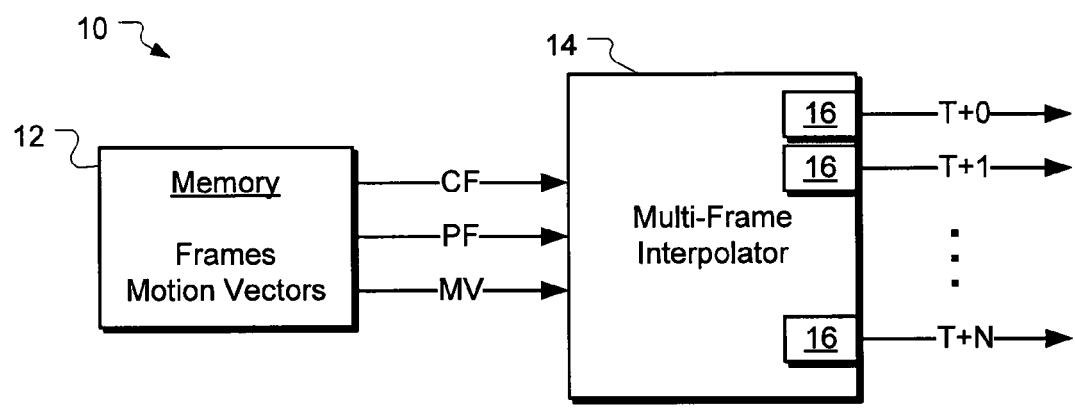
FIG. 1 is a block diagram of a multi-frame video interpolation system according to an embodiment.

FIG. 1 is a block diagram of a multi-frame video interpolation system according to an embodiment. In this embodiment, the system 10 includes a memory 12 and a multi-frame interpolator 14. The memory 12 is coupled to the multi-frame interpolator 14 such that the multi-frame interpolator 14 can receive frames and motion vectors from the memory. In this embodiment, the reception of frames and motion vectors is represented by current frame CF, previous frame PF, and motion vectors MV corresponding to the motion between the previous frame PF and current frame CF.

The memory 12 is configured to store multiple initial frames of a video signal and multiple motion vectors. The initial frames can include frames of a video signal source prior to interpolation. For example, the initial frames can be frames of a movie at about 24 fps. However, the initial frames can be from a variety of video signals with a variety of frame rates, a variety of interlacing formats, or the like.

The memory 12 can, but need not store an entire sequence of frames of a video signal. Any amount of frames of the video signal can be stored in the memory. In an embodiment, only the current frame CF and previous frame PF can be stored in the memory 12. In another embodiment, all of the frames of the video signal can be stored in the memory 12.

The memory 12 can be any variety of memory that can store frames of a video signal. For example, the memory 12 can be a dynamic random access memory. However, other memories can include static random access memories, read-only memories, mass storage devices, network accessed storage, volatile and/or non-volatile memory, other storage devices and their associated storage media, including hard-drives, floppy-disks, optical storage, tapes, flash memory, memory sticks, digital video disks, or the like. Any type of storage that can store initial frames and motion vectors can be used as the memory 12.

Although the term initial has been used to describe frames, as used herein, initial does not imply a particular time within a video signal. For example, a pair of initial frames can be part of the last frames of a video signal, the first frames of a video signal, or the like. Initial is used herein to describe the frames prior to interpolation.

The multi-frame interpolator 14 includes multiple output ports 16. The multi-frame interpolator 14 is configured to interpolate frames between the previous frame PF and the current frame CF using the motion vectors MV. In particular the multi-frame interpolator 14 is configured to process multiple frames in parallel. For example, the multi-frame interpolator 14 can be configured to interpolate multiple frames at substantially the same time such as two frames between the previous frame PF and the current frame CF. The multi-frame interpolator 14 can also be configured to forward one or both of the previous frame PF and the current frame CF.

Accordingly, as multiple interpolated frames, the previous frame PF, and the current frame CF can be available at a given time, multiple frames can be output substantially simultaneously. That is, the multi-frame interpolator 14 can be configured to output a frame through each of the multiple ports 16 at substantially the same time.

In this embodiment, the multi-frame interpolator 14 is configured to output N+1 frames. A frame at time T+0 is output through a first port 16. A frame at time T+1 is output through a second port 16. Similarly, an N+1-th frame at time T+N is output through the N+1-th port 16.

Substantially the same time with reference to the output of frames can include some offset between the frames. As used herein, substantially the same time includes any overlap in time. For example, data representing frame T+0 can be aligned at a bit level to the data representing frame T+1. In another example, one half or less of frame T+0 can have been output when the output of frame T+1 is beginning.

The multi-frame interpolator 14 can be a variety of devices. For example, the multi-frame interpolator 14 can be an application specific integrated circuit (ASIC), a programmable or non-programmable logic device or array, a specially configured general purpose processor, or the like.

In an embodiment, the multi-frame interpolator 14 can receive a first initial frame and a second initial frame of a video signal. For example, the first and second initial frames can be read from the memory 12. In addition, motion vectors can be read from the memory 12. Although the initial frames and the motion vectors can be read from the memory 12 substantially in parallel, the initial frames and the motion vectors can be read from the memory 12 in series, partially in parallel, or the like.

Once the initial frames and the associated motion vectors have been received, frames between the first initial frame and the second initial frame can be interpolated using the motion vectors. Then, multiple frames from among the first initial frame, the second initial frame, and the at least one interpolated frame can be output through the ports 16. For example, if two frames are to be output, a first initial frame and the first interpolated frame can be output through the ports. In another example, two adjacent interpolated frames can be output through the ports 16. In another example, a last interpolated frame and the second initial frame can be output through the ports 16.

Figure 2:
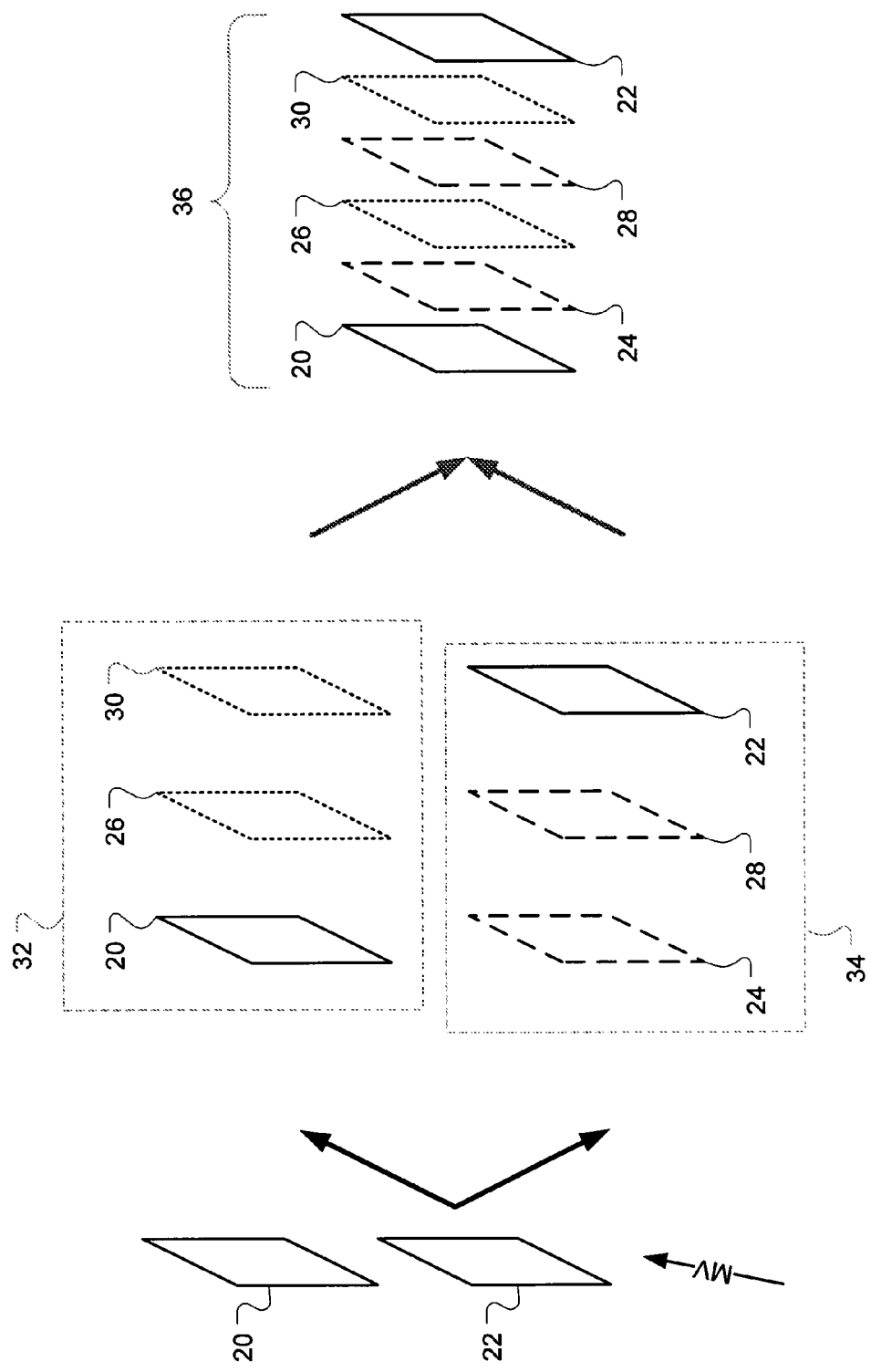
FIG. 2 is a block diagram illustrating frames in various stages of a multi-frame video interpolation system according to an embodiment.

FIG. 2 is a block diagram illustrating frames in various stages of a multi-frame video interpolation system according to an embodiment. In this example, a first initial frame 20, a second initial frame 22 and motion vectors MV are illustrated. For explanation in this example, the initial frames 20 and 22 are frames of a 24 fps video signal such as a movie. The refresh rate of a display is 120 Hz. Thus, five output frames can be generated for each initial frame.

The initial frames 20 and 22 and the motion vectors MV are used by data paths 32 and 34 to interpolate various frames of the output frames. The data paths 32 and 34 represent the interpolation of frames, the pass-through of initial frames, or the like within the multi-frame interpolator 14. Although two data paths are illustrated, any number of data paths can be used. That is, any number of frames can be interpolated and output at substantially the same time.

In data path 32, initial frame 20 is passed through. Frames 26 and 30 are interpolated frames. In data path 34, frames 24 and 28 are interpolated frames and initial frame 22 is passed through. The interpolated frames 26 and 30 of data path 32 are illustrated differently than the interpolated frames 24 and 28 of data path 34 to distinguish the position of the frames in the output frame sequence 36.

The frames 20, 26, and 30 of data path 32 can be output through one of the ports 16 of the multi-frame interpolator 14. The frames 24, 28, and 22 of data path 34 can be output through a second one of the ports 16 of the multi-frame interpolator 14. As will be described in further detail below, the frames can be recombined in sequence. That is the first initial frame 20 from the first data path 32 is followed by the interpolated frame 24 from the second data path 34. The interpolated frame 24 is followed by the interpolated frame 26 from the first data path 32. That is, in this example, the frames of the output frame sequence 36 can alternate from the two data paths 32 and 34, and consequently, from two ports 16 of the multi-frame interpolator 14.

Accordingly, as described above, initial frame 20 can be output substantially simultaneously with interpolated frame 24. Interpolated frame 26 can be output substantially simultaneously with interpolated frame 28. Interpolated frame 30 can be output substantially simultaneously with initial frame 22.

Figure 3:
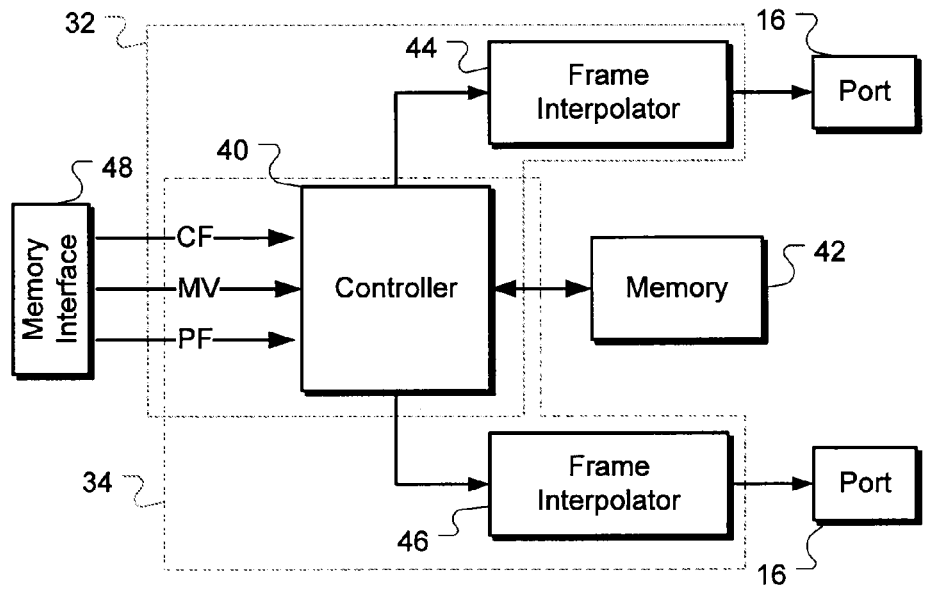
FIG. 3 is a block diagram of a multi-frame interpolator according to an embodiment.

FIG. 3 is a block diagram of a multi-frame interpolator according to an embodiment. In this embodiment, the multi-frame interpolator 14 can include a memory interface 48, a controller 40, a first frame interpolator 44, a second frame interpolator 46, and a memory 42. The memory interface 48 represents the interface between the multi-frame interpolator 14 and the memory 12. For example, the memory interface 48 can include separate ports for receiving each of the previous frame PF, current frame CF, motion vectors MV, or the like. However, the memory interface 48 can take other forms. For example, the memory interface 48 can include a single port coupled to the memory 12.

The controller 40 is coupled to the memory 42. The controller 40 can be configured to receive the previous frame PF, current frame CF, and motion vectors MV as described above. The controller 40 can be configured to store the previous frame PF, current frame CF, and motion vectors MV in the memory 42.

The memory 42 can be referred to as a frame interpolation memory 42 to distinguish the memory 42 from the memory 12. In an embodiment, the frame interpolation memory 42 can be an internal buffer of the multi-frame interpolator 14. That is, the previous frame PF, current frame CF, and motion vectors MV, or the like can be stored local to the frame interpolators 44 and 46. As a result, the data need not be read again from the memory 12. In particular, for a particular output frame sequence, the previous frame PF, current frame CF, and motion vectors MV for that sequence can be stored in the frame interpolation memory 42 so that the frame interpolators 44 and 46 can interpolate frames between the previous frame PF and current frame CF.

In an embodiment, when the last interpolated frame is processed, the previous frame PF may not be necessary. Accordingly, the current frame CF can be used as a previous frame PF of a subsequent output frame sequence. A new current frame CF and motion vectors MV can be received by the controller 40.

As illustrated by dashed lines, data paths 32 and 34 as described with respect to FIG. 2 can include the controller 40. That is, the processing performed by the data paths 32 and 34 can, but need not be separate. Accordingly, the controller 40 can direct the data from the previous frame PF, current frame CF, and motion vectors MV to the appropriate frame interpolator 44 or 46.

Although the controller 40 has been illustrated as the interface between the frame interpolation memory 42 and the memory interface 48, the frame interpolation memory 42 can be accessible directly through the memory interface 48. That is, the controller 40 can, but need not forward data to the frame interpolation memory 42. Rather, the controller 40 can be configured to facilitate a data transfer, initiate the transfer, or the like.

Figure 4:
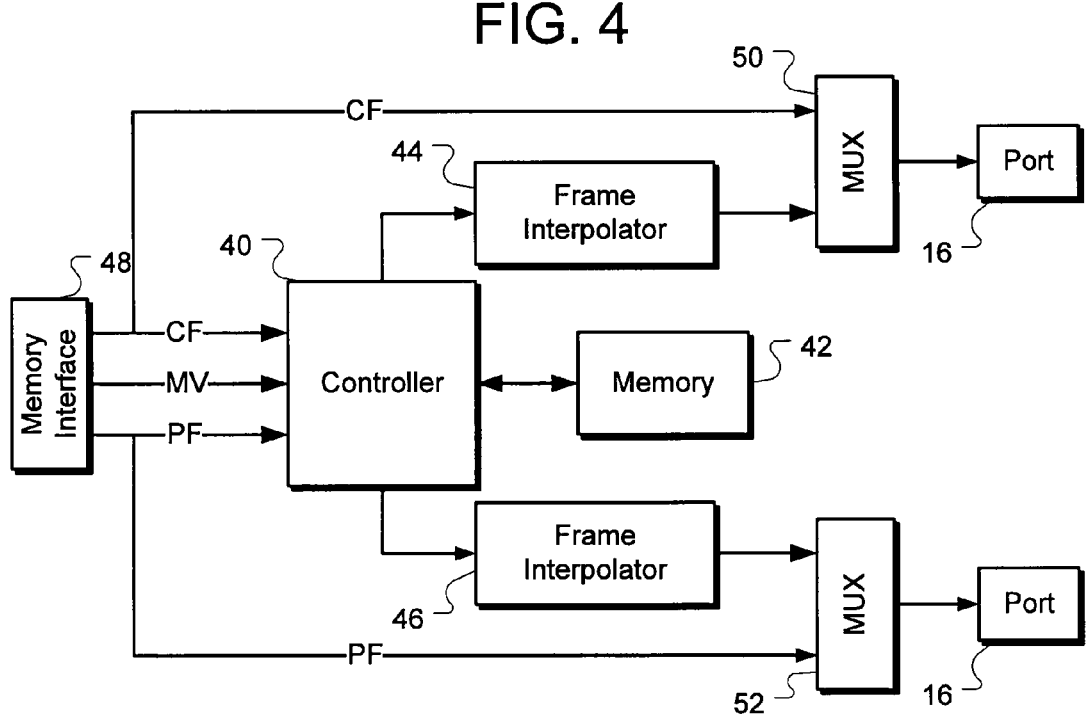
FIG. 4 is a block diagram of a multi-frame interpolator according to another embodiment.

FIG. 4 is a block diagram of a multi-frame interpolator according to another embodiment. In this embodiment, the multi-frame interpolator 14 includes a first multiplexer 50 and a second multiplexer 52. The first multiplexer 50 is coupled to the memory interface 48. The first multiplexer 50 can be configured to receive the current frame CF from the memory interface 48. In particular, the first multiplexer 50 can receive the current frame CF. The first multiplexer 50 is also coupled to the frame interpolator 44. That is, the first multiplexer 50 can select between an interpolated frame from the frame interpolator 44 and the current frame CF. Thus, a first data path is formed between the memory interface 48 and the multiplexer 50. A second data path is formed between the frame interpolator 44 and the multiplexer 50. A frame to be output through the port 16 can travel along these data paths.

Similarly, a second multiplexer 52 can be coupled to the memory interface 48 and the second frame interpolator 46. In this embodiment, the second multiplexer 52 is configured to select from between the previous frame PF, received through the memory interface 48 and an interpolated frame received from the second frame interpolator 46.

Accordingly, with the first multiplexer 50 and the second multiplexer 52, the previous frame PF and the current frame CF can bypass some or all of the processing within the multi-frame interpolator 14. Although the current frame CF and the previous frame PF have been illustrated as being directed towards a particular multiplexer, in an embodiment, either of the first multiplexer 50 and the second multiplexer 52 can receive either of the current frame CF and the previous frame PF. Thus, either of the current frame CF and the previous frame PF can be routed to be output from any port 16.

Figure 5:
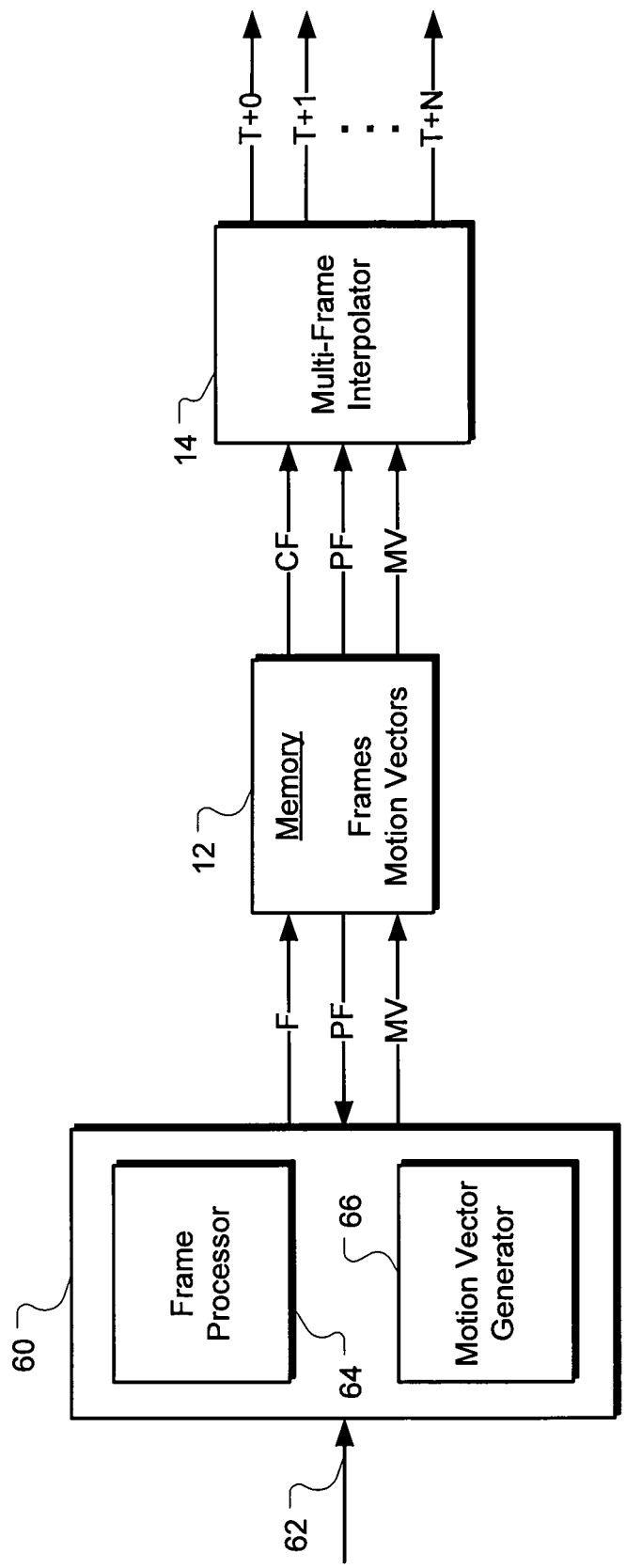
FIG. 5 is a block diagram of a multi-frame video interpolation system according to another embodiment.

FIG. 5 is a block diagram of a multi-frame video interpolation system according to another embodiment. In this embodiment, the system can include a preprocessor 60. The preprocessor 60 can be any variety of devices. For example, similar to the multi-frame interpolator 14 described above, the preprocessor 60 can include an application specific integrated circuit (ASIC), a programmable or non-programmable logic device or array, a specially configured general purpose processor, or the like. The multi-frame interpolator 14 and the preprocessor 60 can, but need not be implemented in similar devices.

The preprocessor can be configured to receive a video signal 62. As a video signal 62 can be in a variety of different formats, some amount of processing may be performed to prepare frames and motion vectors for interpolation in the multi-frame interpolator 14. For example, a video signal 62 can be a movie that has been converted to a standardized video frame rate through a telecine process. Regardless, the frame processor 64 can be configured to process the video signal 62 to generate initial frames for further processing and store the initial frames in the memory 12 as represented by frame F.

As the motion vectors MV described above were stored in the memory 12, the motion vectors have been previously generated. In this embodiment, the motion vectors MV are generated by the motion vector generator 66. For example, a previous frame PF processed by the frame processor 64 can be stored in the memory 12. In this context, the previous frame is a frame relative to a frame currently being processed in the frame processor 64. The motion vector generator 66 can receive the previous frame PF and in conjunction with a current frame within the preprocessor 60, generate the motion vectors MV. The motion vector generator 66 can be configured to store the motion vectors MV in the memory. Accordingly, from an input video signal 62, frames and motion vectors MV can be generated and stored in a memory 12 for interpolation as described above.

Although one previous frame PF is illustrated as being received by the preprocessor 60 from the memory 12, the previous frame PF can be received through multiple ports. For example, a first port can receive the previous frame PF for use with the frame processor 64. A second port can receive the previous frame for use with the motion vector generator 66.

Figure 6:
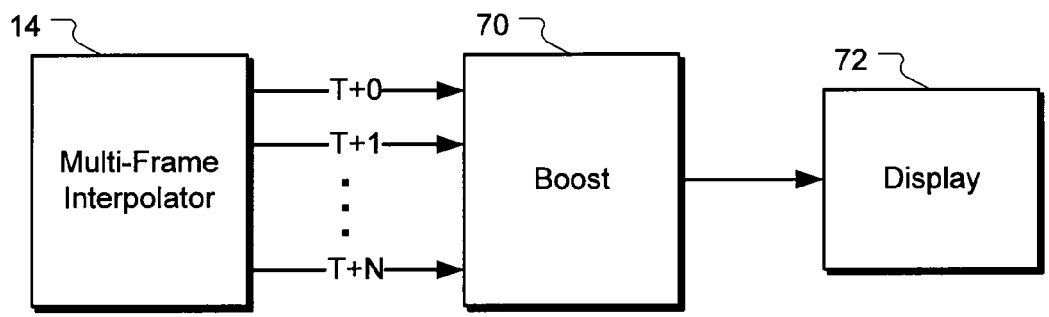
FIG. 6 is a block diagram of a multi-frame video interpolation system according to another embodiment.

FIG. 6 is a block diagram of a multi-frame video interpolation system according to another embodiment. In this embodiment, the multi-frame interpolator 14 is coupled to a boost circuit 70. The boost circuit 70 is configured to drive a display 72. For example, the boost circuit 70 can be configured to receive two frames at times T+0 and T+1, respectively, from two ports 16 of the multi-frame interpolator 14. The boost circuit 70 can be configured to drive the display 72 using both frames corresponding to times T+0 and T+1. Accordingly, the boost circuit 70 can be configured to overdrive the display 72 to achieve a desired performance.

Figure 7:
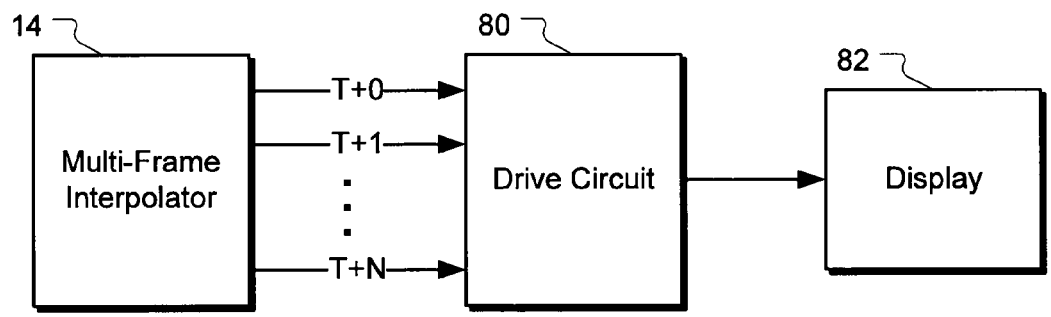
FIG. 7 is a block diagram of a multi-frame video interpolation system according to another embodiment.

FIG. 7 is a block diagram of a multi-frame video interpolation system according to another embodiment. In this embodiment, the multi-frame interpolator 14 is coupled to a drive circuit 80. In particular, the drive circuit 80 can be coupled to the ports 16 of the multi-frame interpolator 14. The drive circuit 80 is configured to drive the display 82.

In an embodiment, the display 82 can be configured to operate at a frame rate that is faster than individual frames can be interpolated in the multi-frame interpolator 14. That is, the time for interpolation of one frame through the multi-frame interpolator 14 is larger than the inverse of the frame rate. However, since the multi-frame interpolator 14 can generate multiple interpolated frames in parallel, multiple frames are available to the drive circuit 80 for driving the display at the higher frame rate.

For example, the display 82 can be a 240 Hz display. The multi-frame interpolator 14 can be configured to produce single frames at a 120 Hz refresh rate through one of the data paths as described above. However, the multi-frame interpolator 14 can be configured to generate two frames, each at a 120 Hz refresh rate. Thus, the aggregate refresh rate can be the 240 Hz rate of the display 82. In other words, the drive circuit 80 can be configured to alternate among the frames output from the multi-frame interpolator 14 to drive the display 82. As a result, a parallel configuration of multiple frames can be used to serially drive the display 82 at a frame rate higher than that of an individual frame rate of one stream of the parallel configuration.

In an embodiment, the drive circuit 80 can be configured to drive a backlight of the display 82. For example, the backlight can be a two dimensional array of LEDs that can provide different backlight intensities across the display 82. The intensities of the individual LEDs, groups of the LEDs, or the like can be controlled in response to the multiple output frames. Moreover, any aspect or multiple aspects of the display 82 can be controlled in response to multiple frames. For example, in an embodiment, both an overdrive level and a backlight level can be controlled in response to multiple frames.

Although a particular sequence of frames has been illustrated as being output from particular ports of the multi-frame interpolator, the frames can be output through the ports in any sequence and the ordering of the output of the frames can change. For example, in FIG. 1 the output frames are illustrated as ordered in time sequence from time T+0 through time T+N from one end of the multi-frame interpolator to another. However, the order can be different, for example, the order can be reversed. Moreover, such ordering can change as the frames are output. That is, the same order can, but need not be preserved during operation of the multi-frame interpolator.

Although particular embodiments have been described, it will be appreciated that the principles of the invention are not limited to those embodiments. Variations and modifications may be made without departing from the principles of the invention as set forth in the following claims.

What is claimed is:

1. A system, comprising:
a memory configured to store a plurality of initial frames of a video signal and a plurality of motion vectors; and
a multi-frame interpolator coupled to the memory and including a first output port and a second output port, the frame interpolator configured to generate a first output frame and a second output frame from the initial frames and the motion vectors, to output the first output frame through the first output port and output the second output frame through the second output port, the interpolator comprising:
a multiplexer coupled to the first output port;
a memory interface coupled to the memory;
a frame interpolator configured to generate an interpolated frame;
a first data path coupled between the memory interface and the multiplexer; and
a second data path coupled between the frame interpolator and the multiplexer.

2. The system of claim 1, wherein the first output frame and the second output frame are two adjacent frames of a first initial frame of the initial frames, a second initial frame of the initial frames, and at least one interpolated frame interpolated between the first initial frame and the second initial frame.

3. The system of claim 1, wherein the multi-frame interpolator comprises a frame interpolation memory and the frame interpolator is configured to store a first initial frame of the initial frames, a second initial frame of the initial frames, and motion vectors of the motion vectors associated with the first initial frame and the second initial frame.

4. The system of claim 1, wherein the multi-frame interpolator further comprises:
a second multiplexer coupled to the second port;
a second frame interpolator configured to generate an interpolated frame;
a third data path coupled between the memory interface and the second multiplexer; and
a fourth data path coupled between the second frame interpolator and the second multiplexer.

5. The system of claim 1, further comprising a motion vector generator configured to generate the motion vectors for the initial frames.

6. The system of claim 5, wherein the motion vector generator is configured to store the motion vectors in the memory.

7. The system of claim 1, further comprising a frame processor configured to receive an input video signal including a plurality of input frames, and configured to generate the initial frames in response to the input frames.

8. The system of claim 1, further comprising:
a display; and
a boost circuit coupled to the first port and the second port of the multi-frame interpolator, and configured to drive the display in response to output frames received through the first port and the second port.

9. The system of claim 1, further comprising:
a display; and
a display driver coupled to the first port and the second port of the multi-frame interpolator and configured to select an output frame alternating between the first port and the second port to drive the display.

10. A method, comprising:
receiving a plurality of initial frames of a video signal at a multi-frame interpolator;
receiving, at the multi-frame interpolator, motion vectors associated with a difference between pairs of the plurality of initial frames and;
interpolating at least two interpolated frames between the pairs of the initial frames in response to the motion vectors;
multiplexing between at least one of initial frames and the interpolated frames to output a plurality of output frames through a plurality of ports; and
using at least two of the output frames to overdrive a display using the at least two output frames.

11. The method of claim 10, wherein outputting the output frames comprises outputting two adjacent frames from among the first initial frame, the second initial frame, and the at least one interpolated frame substantially simultaneously through two ports of the plurality of ports.

12. The method of claim 10, further comprising:
receiving an input video signal;
generating frames of the video signal from the input video signal; and
storing the generated frames in a memory;
wherein:
receiving the first initial frame includes reading the first initial frame from the generated frames in the memory; and
receiving the second initial frame includes reading the second initial frame from the generated frames in the memory.

13. The method of claim 10, further comprising alternating among the output frames to drive a display.

14. The method of claim 13, wherein alternating among the output frames to drive the display comprises alternating between output frames output through a first port and a second port of the plurality of ports to drive the display.

* * * * *